United States Patent
Tsuji

(10) Patent No.: US 10,762,728 B2
(45) Date of Patent: Sep. 1, 2020

(54) ELECTRONIC CONTROL UNIT

(71) Applicant: DENSO CORPORATION, Kariya, Aichi-pref. (JP)

(72) Inventor: Hirokazu Tsuji, Kariya (JP)

(73) Assignee: DENSO CORPORATION, Kariya (JP)

( * ) Notice: Subject to any disclaimer, the term of this patent is extended or adjusted under 35 U.S.C. 154(b) by 323 days.

(21) Appl. No.: 15/287,898

(22) Filed: Oct. 7, 2016

(65) Prior Publication Data

US 2017/0124778 A1    May 4, 2017

(30) Foreign Application Priority Data

Oct. 29, 2015    (JP) ................... 2015-212966

(51) Int. Cl.
*G07C 5/08*    (2006.01)
*B60R 16/023*    (2006.01)

(52) U.S. Cl.
CPC .......... *G07C 5/085* (2013.01); *B60R 16/0234* (2013.01); *G07C 5/0825* (2013.01)

(58) Field of Classification Search
None
See application file for complete search history.

(56) References Cited

U.S. PATENT DOCUMENTS

| | | | |
|---|---|---|---|
| 5,745,048 A | 4/1998 | Taguchi et al. | |
| 2006/0137326 A1 | 6/2006 | Saito et al. | |
| 2012/0277949 A1* | 11/2012 | Ghimire | G07C 5/008 |
| | | | 701/31.4 |
| 2014/0105481 A1* | 4/2014 | Hasselbusch | G06T 7/0006 |
| | | | 382/141 |

FOREIGN PATENT DOCUMENTS

| | | |
|---|---|---|
| JP | 2011-121462 A | 6/2011 |
| JP | 4946161 B2 | 3/2012 |
| JP | 2013-181512 A | 9/2013 |
| JP | 2014-055547 A | 3/2014 |
| JP | 2015-011617 A | 1/2015 |

* cited by examiner

*Primary Examiner* — Christian Chace
*Assistant Examiner* — Kyung J Kim
(74) *Attorney, Agent, or Firm* — Posz Law Group, PLC

(57) ABSTRACT

An in-vehicle electronic control unit disposed in a vehicle is equipped with (i) a fault-diagnosis function for diagnosing a fault of a component in the vehicle and (ii) a deterioration detector function for detecting a degree of deterioration of the component in the vehicle, which includes a deterioration information memory for memorizing deterioration information regarding a deterioration of each of the vehicle components, a deterioration checker for detecting whether the degree of deterioration has reached a check value for each of the vehicle components, and a recorder for recording the deterioration information of the component in the deterioration information memory when the degree of deterioration of the component has reached the check value. Thereby, the deterioration information of the component is storable at a component-worn timing when the degree of deterioration/wear of the subject component rises to a certain level.

14 Claims, 10 Drawing Sheets

ELECTRONIC CONTROL UNIT

CROSS REFERENCE TO RELATED APPLICATION

The present application is based on and claims the benefit of priority of Japanese Patent Application No. 2015-212966, filed on Oct. 29, 2015, the disclosure of which is incorporated herein by reference.

TECHNICAL FIELD

The present disclosure generally relates to an in-vehicle electronic control unit disposed in a vehicle for recording data that is utilized for a fault analysis of vehicular components.

BACKGROUND INFORMATION

Generally, the in-vehicle electronic control unit for use in a vehicle is equipped with a diagnosis function, i.e., a function that performs a self-diagnosis of whether abnormality, failure, or the like occurs in a vehicle based on the detection signal detected by the sensor. An example of such unit, i.e., a device, that memorizes/records the data for analysis of the causes of the abnormality, fault and/or failure generated in a vehicle, is disclosed in a patent document, JP 2013-181512 A (Patent document 1).

According to the above-mentioned conventional configuration, the above device memorizes the data only when a fault occurs in a vehicle. Therefore, for a fault analysis, the data for such analysis is available only about a fault occurrence time.

However, especially in recent years, for the analysis of the cause of the deterioration of a component in a vehicle, the data allowing such analysis is in strong demand. That is, a recordation of the data providing a clue of the deterioration of the vehicle component which finally leads to the fault of the component is requested for a deterioration analysis of the component, for a start-of-use to fault period, i.e., as a deteriorated-to-certain-degree/level data of the component, or as a deterioration information of the component.

SUMMARY

It is an object of the present disclosure to provide an in-vehicle electronic control unit that is capable of recording deterioration information of an in-vehicle component, which is recorded for a certain period of time during a deterioration of the in-vehicle component.

In an aspect of the present disclosure, an in-vehicle electronic control unit (ECU), which is disposed in a vehicle equipped with (i) a fault-diagnosis function for diagnosing a fault of a component in the vehicle and (ii) a deterioration detector function for detecting a degree of deterioration of the component in the vehicle, includes a deterioration information memory memorizing deterioration information of the component, a deterioration checker checking whether the degree of deterioration has reached a check value for each component, and a recorder writing the deterioration information of the component in the deterioration information memory, when the degree of deterioration of the component has reached the check value.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
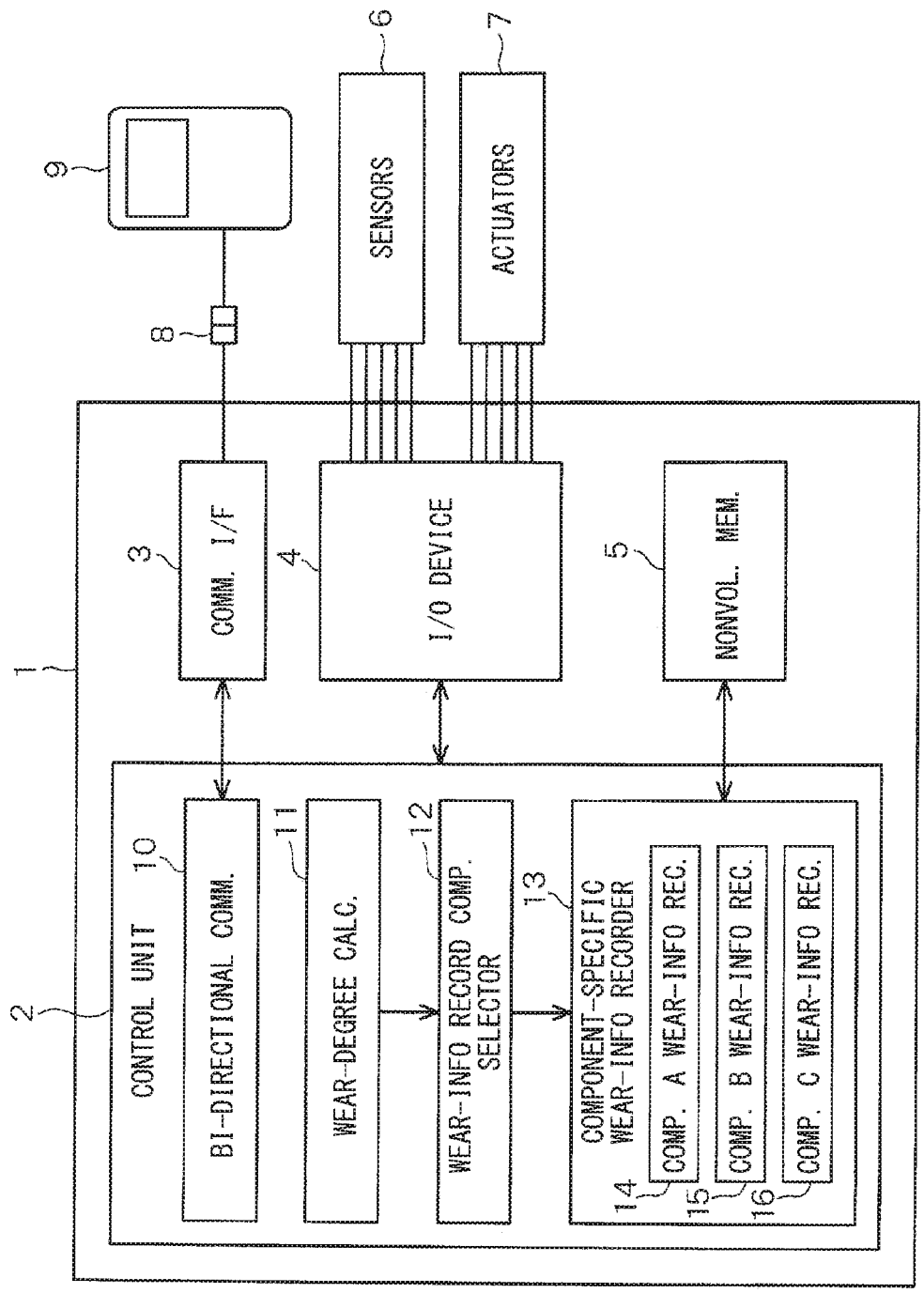
FIG. 1 is a block diagram of an engine ECU in a first embodiment of the present disclosure.

Hereafter, the first embodiment which applies the present disclosure to an engine electronic control unit (ECU) is described with reference to FIGS. 1 thru 11. The engine ECU 1 of the present embodiment is provided with, for example, a control unit 2 that consists of a microcomputer, a communication interface 3, an input/output device 4, and a nonvolatile memory 5.

The input/output device 4 is connected to various sensors 6 (for example, to an oxygen sensor etc.) and to various actuators 7 (for example, to an injector etc.). The communication interface 3 serves as an interface of connection to a vehicle diagnostic device 9 (for example, a diagnostic tester) via a connector 8.

The control unit 2 is provided with a bi-directional communication part 10, a wear-degree calculator 11, a wear-information record component selector 12, and a component-specific wear-information recorder 13 classified by components.

The bi-directional communication part 10 has a function for transmitting and receiving a signal to the vehicle diagnostic device 9 via the communication interface 3.

The wear-degree calculator 11 receives signals from the various sensors 6 and the various actuators 7 via the input/output device 4, and has a function for calculating a degree of deterioration (i.e., a degree of wear) of each of the various components in a vehicle (for example, the injector, the catalyst, etc.) based on the received signals. The degree of deterioration (i.e., the degree of wear) of a certain component may be paraphrased as to how much degree/percentage, or to what extent, the deterioration of the component has reached at the moment of calculation described above. The degree of deterioration may also be designated as a wear-degree, or a degree of wear, of a component.

Figure 2:
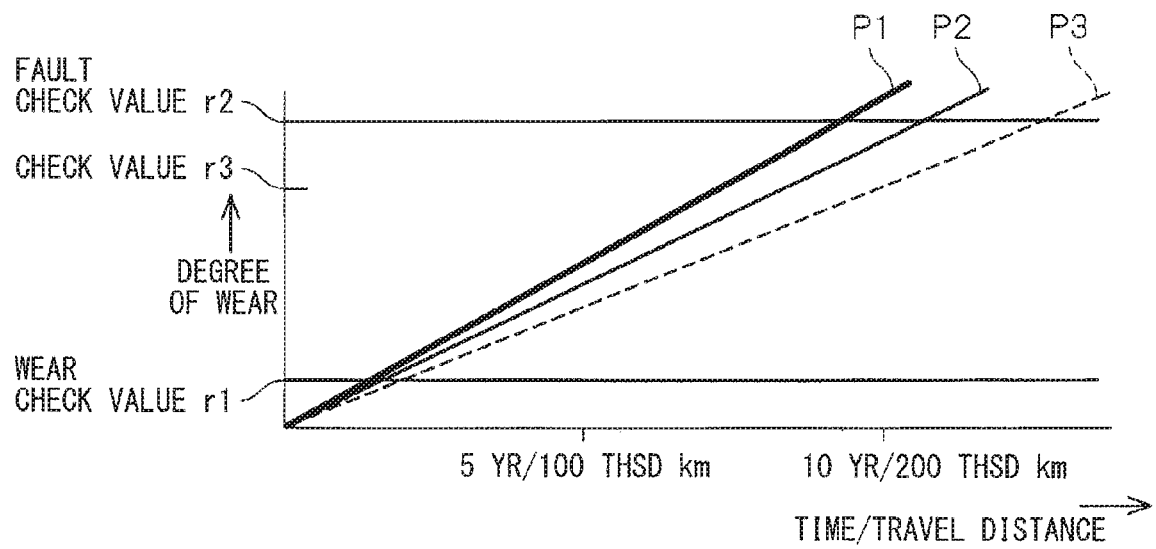
FIG. 2 is a graph of deterioration characteristics of a component.

Now, as an example, change of the degree of deterioration (i.e., wear) of each of three components A, B, and C is shown in FIG. 2. The vertical axis of FIG. 2 shows the degree of deterioration (i.e., wear), and the horizontal axis of FIG. 2 shows time (year) or mileage (10,000 km).

In FIG. 2, a solid line P1 shows the degree of wear of the component A, a solid line P2 shows the degree of wear of the component B, and a dashed line P3 shows the degree of wear of the component C. In FIG. 2, the lines A, B, C drawn respectively as a linear line (i.e., a straight line) are actually a non-linear line.

The wear information record component selector 12 selects a component, or more than one component, for which information regarding deterioration, i.e., deterioration information or "wear information" hereafter, is recorded, or memorized, based on a determination for each of the components whether the degree of wear of the component has reached a predetermined check value r1 (i.e., the check value r1 hereafter).

The wear information record component selector 12 has a function as a deterioration checker in the claims. The above-mentioned check value r1 is a determination level of the degree of deterioration for recording/memorizing deterioration analysis data.

As shown in FIG. 2, the same check value r1 is used for all of the three components A, B, and C. However, respectively different check values r1 may be set up for the three components A, B, and C. Further, in FIG. 2, a fault check value r2 is a value based on which a fault of the component is determined. That is, when the degree of wear exceeds the value r2, the component is determined as faulty, i.e., as having a fault.

The component-specific wear-information recorder 13 serves as a recorder in the claims, recording, i.e., writing, the wear information for each of the components, and, more specifically, is provided with a component A wear-info recorder 14, a component B wear-info recorder 15, and a component C wear-info recorder 16. That is, a component X wear-info recorder is provided as a recorder for recording the wear information of the component X.

In such case, each of the recorders 14, 15, and 16 is configured to write the wear information, i.e., the deterioration analysis data or the wear analysis data hereafter, in a wear information record area of the selected component (i.e., A, B, or C) in the nonvolatile memory 5.

For example, as seen in FIG. 2, since the degree of wear of the component A reaches the check value r1 first in the present embodiment, the wear analysis data of the component A is memorized first in the nonvolatile memory 5.

Then, since the degree of wear of the component B reaches the check value r1, the wear analysis data of the component B is memorized in the nonvolatile memory 5.

Then, since the degree of wear of the component C reaches the check value r1 after the component B, the wear analysis data of the component C is memorized in the nonvolatile memory 5.

In such case, the nonvolatile memory 5 has a function of a deterioration information memory in the claims.

Further, the storage capacity of the nonvolatile memory 5 is configured as greater than the maximum size wear information among the components disposed in the vehicle. In other words, the size of the wear information of each of the components in the vehicle is set up in advance.

Further, the nonvolatile memory 5 is implemented as a flash memory, an Electronically Erasable Programmable Read-Only Memory (EEPROM), a Secure Digital (SD) card memory, or the like, for example.

Next, operation of the above-mentioned configuration is described with reference to FIGS. 4 thru 11.

The flowcharts in FIGS. 4 thru 10 respectively show different controls of the control unit 2, and these controls are performed repeatedly in parallel at preset intervals. The flowchart of FIG. 11 shows the contents of a repair work by using the vehicle diagnostic device 9.

Figure 4:
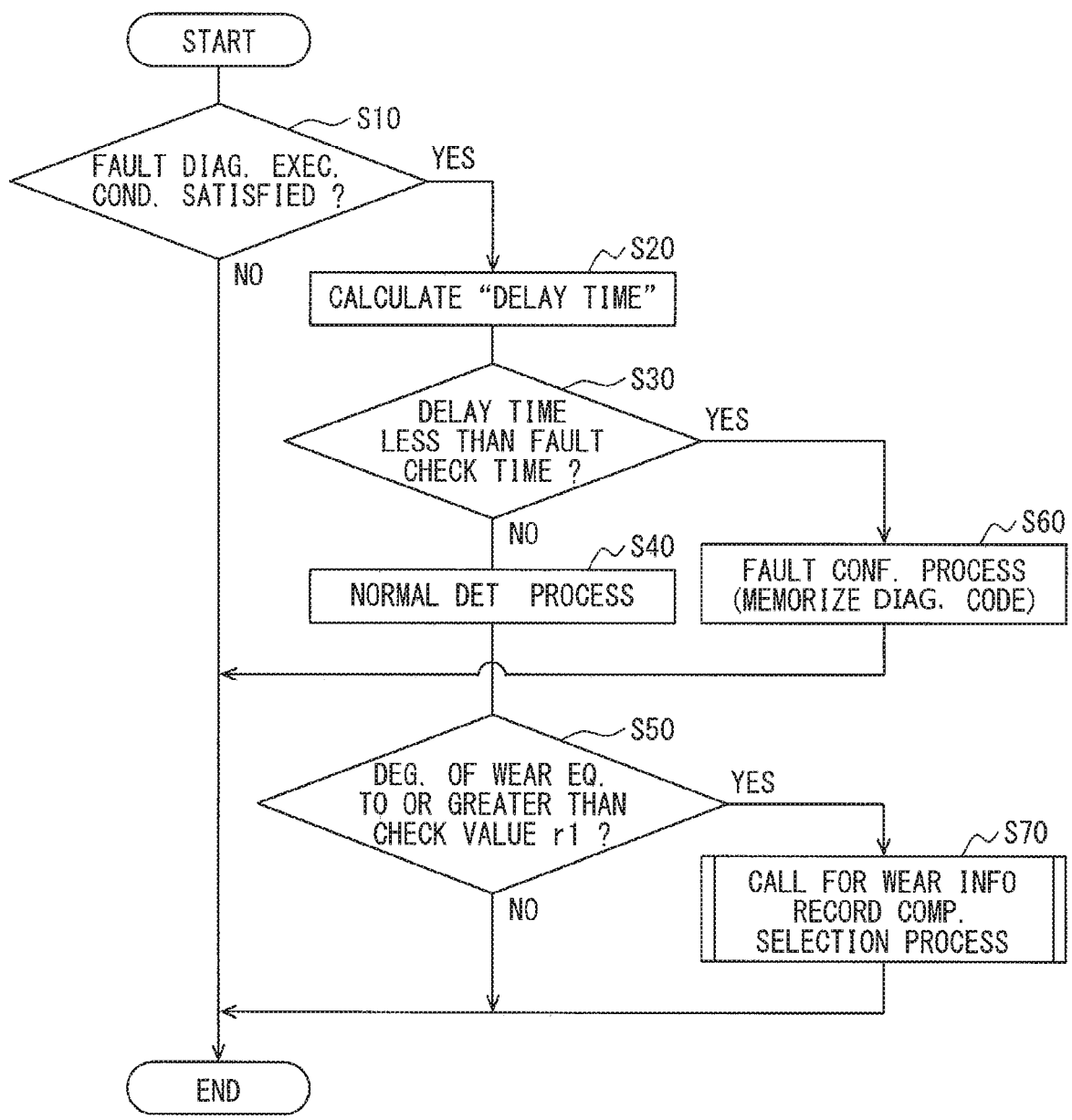
FIG. 4 is a flowchart of a control which determines fault and deterioration of the components.

First, a flowchart of FIG. 4 shows the contents of a control for detecting a fault of a vehicular component such as a catalyst (e.g., a control of the component A wear-info recorder 14 assuming that the component A is a catalyst in the vehicle).

In Step S10 of FIG. 4, it is determined whether a fault-diagnosis execution condition of the catalyst is satisfied. That is, in other words, it is determined whether an obtainment of the data required for a calculation of a fault check index (i.e., a wear check parameter), that may be a "delay time" in this case, for example, is complete.

In such case, the "delay time" is a time difference between time t1 and time t2, among which time t1 is a timing at which a front oxygen sensor disposed in a front part of the catalyst becomes lean from rich and time t2 is a timing at which a rear oxygen sensor disposed in a rear part of the catalyst becomes lean from rich. What is required in this case is thus to determine whether each of the measurements at time t1 and at time t2 is complete for obtaining the required data. Note that the shorter the "delay time" is, the higher the degree of wear derived/calculated from the "delay time" becomes.

Both of the degree of wear and the check value r1 may preferably be a value that is independent from the fault check index of the component, i.e., a universal value between 0 (as a new product, or at a product shipping time) and 100 (at a fault confirmed time, or as r2) such as a percentage.

Further, when a percentage is used as such degree of wear, for example, the above-mentioned check value r1 may be preferably set as 10% indicating that the deterioration/wear of the product has advanced/progressed by such degree.

In the above-mentioned step S10, when the fault-diagnosis execution condition is satisfied, the process proceeds to Step S20, and the "delay time, i.e., the time difference from time t1 to time t2," is calculated as a fault check index.

Subsequently, the process proceeds to Step S30, and it is determined whether the "delay time" is shorter, i.e., less, than a preset fault check time for the catalysts (i.e., a delay time equivalent to the fault check value r2).

Here, when the "delay time" is equal to or greater than the fault check time for the catalysts (i.e., the degree of wear of the catalyst is less than the fault check value r2), the process proceeds to Step S40, and a predetermined normal determination process is performed.

Then, the process proceeds to Step S50, and it is determined whether the "delay time" is equal to or greater than a determination level of the degree of wear, i.e., the check value r1, for recording the wear information.

In such case, since the "delay time" is an amount of time, the "delay time" may be converted to a universal rate, i.e., to the degree of wear, and such a converted degree of wear may be compared with the check value r1.

In the above-mentioned step S50, the present control is finished without performing any step, i.e., proceeding to "NO", when the degree of wear is less than the check value r1.

Figure 5:
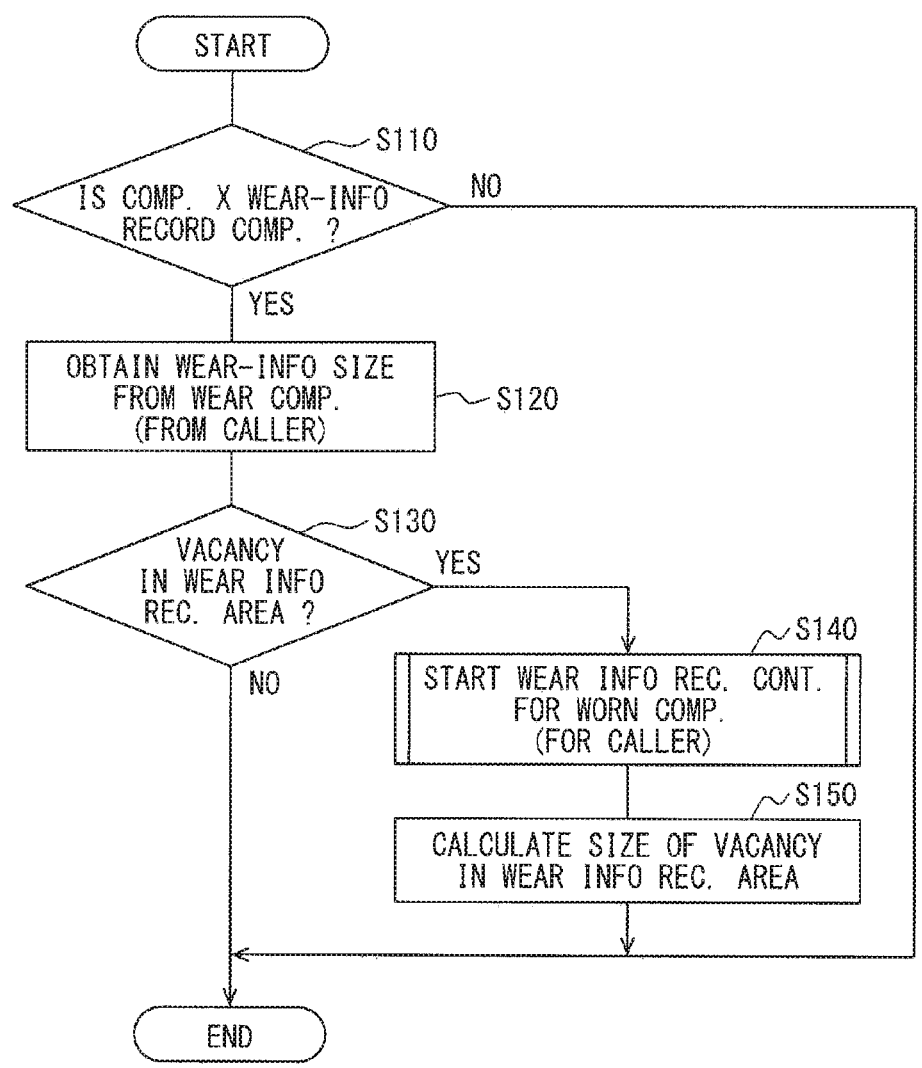
FIG. 5 is a flowchart of a control which selects a component for which deterioration information is memorized.

Further, in the above-mentioned step S50, when the degree of wear of the catalyst is equal to or greater than the check value r1, the process proceeds to Step S70, and calls for a wear information record component selection control, i.e., a control by which a component is selected for recording the wear information. More practically, a catalyst is selected as a component X, and the control of FIG. 5 is performed on such component. Then, upon completion of the execution of such control (i.e., a control which selects the above-mentioned wear information record component) in FIG. 5, such a control is finished.

In the above-mentioned step S30, when the "delay time" is less than the fault check time for the catalysts, the process proceeds to Step S60 and predetermined fault confirmation process is performed.

In such case, a diagnostic trouble code of a catalyst fault is memorized, and the processes (i) for notifying the catalyst fault to the user and (ii) for recording the fault analysis data may be performed, before finishing such a control.

Next, with reference to FIG. 5, a wear information record component selection control is described.

In Step S110 of FIG. 5, it is determined whether the component X is a wear-info record component for which the wear information is recorded.

Here, the control is finished without performing any step, i.e., proceeding to "NO", when the component X is not the wear-info record component.

As described above, the component X is a catalyst and is a wear-info record component, the process proceeds to Step S120, and obtains from a caller, i.e., a fault detection control of FIG. 4, information regarding a size of the wear information of a worn component, i.e., the catalyst in this case.

Then, the process proceeds to Step S130, and it is determined whether the wear information record area of the nonvolatile memory 5 has a vacancy, i.e., whether the size of vacancy of the wear information record area is greater than the size of the wear information of the catalyst. Note that the wear information record area is reserved in advance as a memory area having a preset size in the nonvolatile memory 5. The present control is finished without performing any step, i.e., proceeding to "NO", when there is no vacancy in the wear information record area.

In the above-mentioned step S130, when the vacancy is found in the wear information record area, the process proceeds to Step S140, and a wear information record control which records the wear information of the worn component (i.e., the catalyst) is started for recording the wear information of the worn component (i.e., for the caller).

Figure 6:
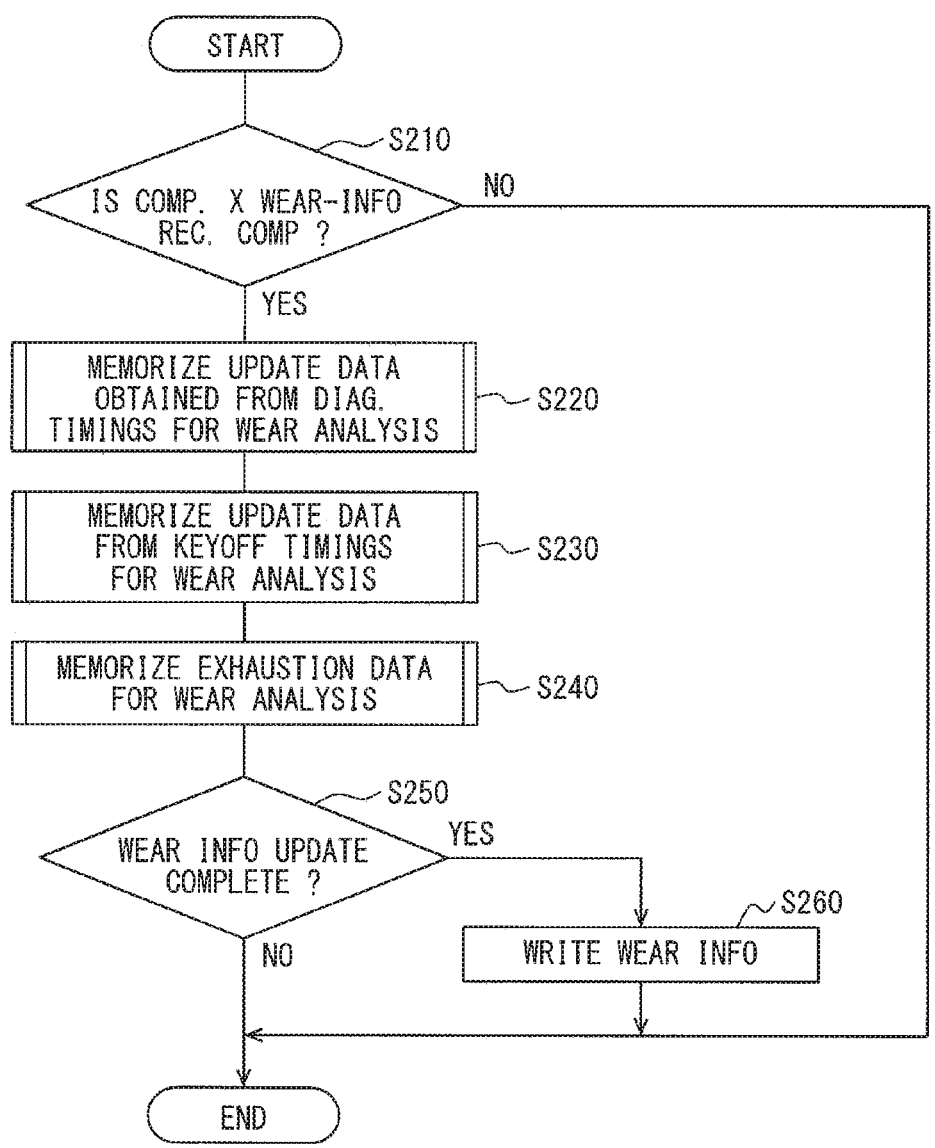
FIG. 6 is a flowchart of a control which memorizes the deterioration information that is specific to each component.

In such case, what is required as the contents of the process of S140 is to set a flag for a determination in S210 of FIG. 6, so that a determination process in S210 of FIG. 6 is determined as YES, i.e., determining that the component X is a wear information record component.

Note that a control of FIG. 6 is performed in parallel with a control of FIG. 5, and when the above-mentioned flag for the determination is set, the control of FIG. 6 is performed.

Then, when the execution of the process of the above-mentioned step S140 is complete, the process proceeds to Step S150, calculates the size of vacancy (i.e., capacity) of the wear information record area, and the calculation result is memorized in a non-illustrated memory (e.g., in a Random Access Memory (RAM), etc.) of the engine ECU 1. Then, the present control is finished.

Figure 7:
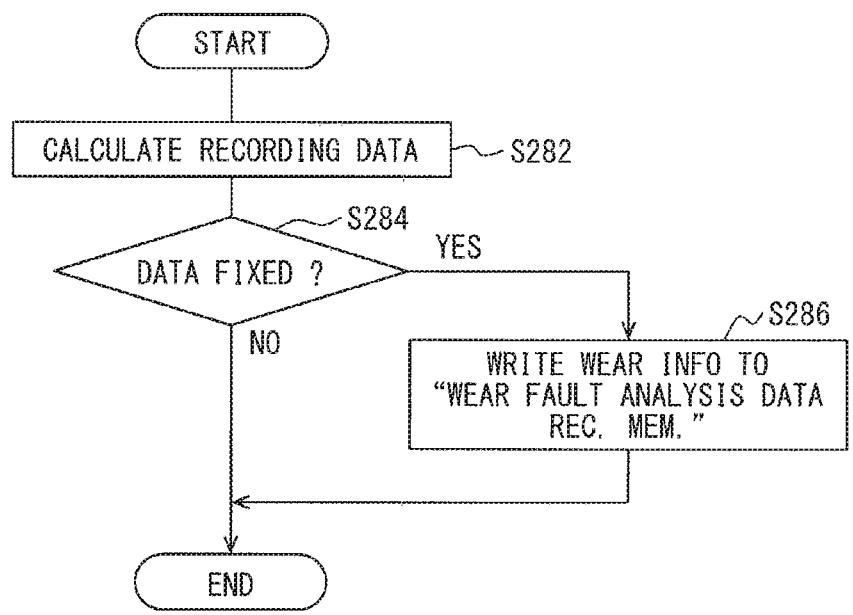
FIG. 7 is a flowchart of a control which memorizes the deterioration information that is specific to each data.

Next, with reference to FIGS. 6 and 7, a control which memorizes (i.e., records) the wear information of a worn component is described.

In Step S210 of FIG. 6, it is determined whether the component X is a wear-info record component. More practically, depending on whether the flag for the determination set up in Step S140 of FIG. 5 is set, the component X is either determined or not determined as such component.

When the component X is not a wear-info record component, the process proceeds to "NO", and the control is finished. In the above-mentioned step S210, when the component X is a wear-info record component, the process proceeds to Step S220.

In step S220, update data is obtained from each of diagnosis timings for wear analysis, and the obtained data is memorized in a memory in the engine ECU 1. The above-mentioned update data from each of the diagnosis timings is data calculated from a certain value at a specific condition satisfied time, i.e., at a fault diagnosis time, which may be, for example, worst N pieces of diagnosis data together with the data of the drive state at a time of such diagnosis (e.g., data regarding an engine rotation number, an engine cooling water temperature, an accelerator opening, a vehicle speed, an acceleration, etc.) which are calculated and obtained in a suitable manner.

Here, a control of FIG. 7 is called for and performed for obtaining the data.

In Step S282 of FIG. 7, the calculation of the recording data (for example, data of resolution power, of a unit measurement, etc.) regarding the recording object is performed.

In such case, the data (for example, parameter) used by the normal control is obtained, and, the data of the recording object is calculated based on the obtained data. For example, by obtaining the vehicle speed data, an acceleration of the vehicle is calculated based on the obtained vehicle speed data (i.e., data of the recording object).

Then, the process proceeds to Step S284, and it is determined whether data to be written is fixed, i.e., is determined. That is, whether the data to be written in a memory of the engine ECU 1, which is equipped with a wear fault analysis data record memory, is fixedly prepared or is fixedly determined.

Here, when the data to be written is not fixedly determined, the process proceeds to "NO" and the control is finished, and a repeated execution of this control is hereafter performed until the calculation of the data of all recording objects is complete, i.e., until the data is fixedly determined.

Note that the data of fixed determination timing may vary data to data.

In the above-mentioned Step S284, when the data to be written is fixedly determined (i.e., when the calculation of the data of all recording objects is complete), the process proceeds to Step S286, and the data of the wear information or the data of the fault information is written in the wear fault analysis data record memory.

Here, the above-mentioned wear fault analysis data record memory is a memory provided in the engine ECU 1, and is a memory that is different from the nonvolatile memory 5. That is, the wear fault analysis data record memory may be, for example, a RAM, an EEPROM, a flash memory, etc.

The data written in the wear fault analysis data record memory is used only as the data which is to be outputted to the vehicle diagnostic device 9 as the wear information, in which no halfway data is included. Such a configuration prevents the data of halfway calculation to be written in the memory as the wear information. That is, such a halfway calculation data is prevented from being read out from the memory.

Note that each of the recording data is selected based on various criteria, such as "how such data is calculated", "at what timing the data becomes effective as wear information in the course of periodical update", "is the data effective for the vehicle repair/maintenance", "the component has an expected quality?", and the like. The selected recording data is then written in the wear fault analysis data record memory.

Next, the process proceeds to Step S230 of FIG. 6, and the update data obtained at key-off timings for wear analysis is memorized in the memory in the engine ECU 1.

In such a process, just like Step S220 described above, a control of FIG. 7 is called for and is repeatedly executed. The key-off timing update data is data measured in every cycle of engine operation, i.e., for a period from key-on to key-off, which may calculated and obtained as the data of engine operation time, of travel distance, of the number of idle stop operations (i.e., the number of engine stops) and the like. The key-off timing update data may be utilized for an analysis of vehicle usage, for example.

Then, the process proceeds to Step S240, and obtains the data about the exhaustion for wear analysis, and the obtained data is memorized in the memory in the engine ECU 1. In such a process, just like Steps S220 and S230 described above, a control of FIG. 7 is called for and is repeatedly executed.

The above-mentioned exhaustion data is recorded for recognizing the exhaustion rate of the component against the guarantee denominator. That is, for example, when an injector life is assumed to be exhausted after the number of injections of N times, the exhaustion data may be calculated and obtained every time the number of injections passes 1 percentile against the N times (i.e., at every N/100 times of injection).

The degree of wear of the injector is calculated as a rate, i.e., a division of accumulated valve opening time from a new product divided by a worn-to-fault, i.e., total, valve opening time of the injector. That is, a time for accumulating deterioration to cause a fault, or a "deterioration fault" time, of the injector is measured as the degree of wear of the injector.

Then, the process proceeds to Step S250, and it is determined whether an update of the wear information is complete, i.e., whether the conditions to write the wear information in the nonvolatile memory 5 are satisfied.

In such case, a time when the conditions to write the data are satisfied may be determined as, for example, a time when a fault of the component is fixedly determined, or a time when the degree of wear of the component has reached the check value r1 in FIG. 2, or a time when the degree of wear of the component has reached a wear record value (i.e., a determination value for recording the wear information) r3 in FIG. 2. Note that the wear record value r3 is a value set in between the check value r1 and the check value r2. Further, other than the degree of wear, a set number of years against (i.e., in view of) the expected/guaranteed product life, or other standard/guaranteed number of reference may also be used as the data write condition. Further, the data write condition may preferably be set as a different value from component to component.

In the above-mentioned Step S250, when the conditions to write the wear information in the nonvolatile memory 5 are reached, i.e., satisfied, the process proceeds to Step S260, and the wear information (i.e., wear analysis data) of the component or the fault information of the component is written in the nonvolatile memory 5.

Figure 3:
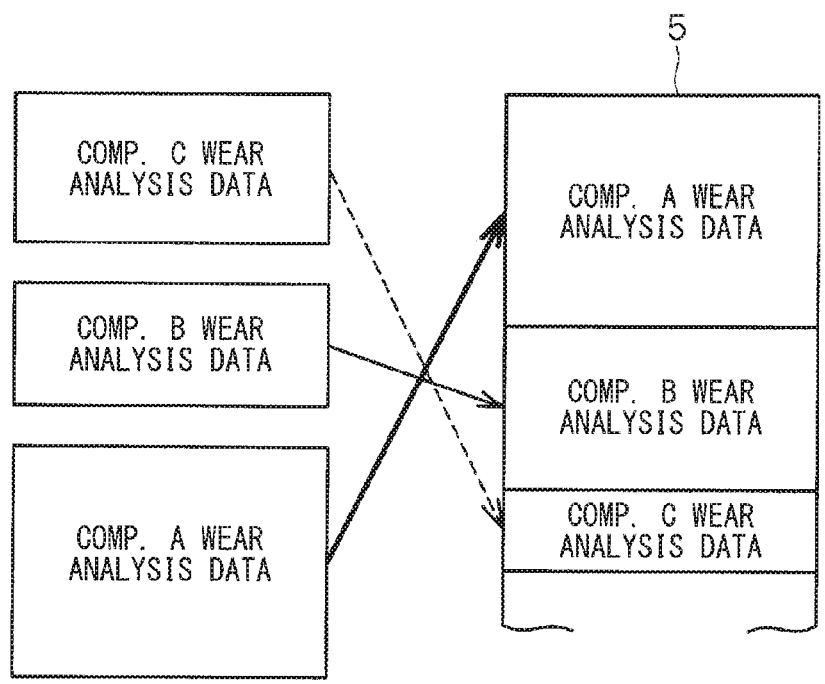
FIG. 3 is an illustration of procedure of memorizing deterioration analysis data.

In such case, as shown in FIG. 3, the wear information of the component and the like are written in the nonvolatile memory 5 by an order of reaching the check value r1. Then, the control is finished. Note that, if the condition to write the wear information in the nonvolatile memory 5 is not satisfied in Step S250, the process proceeds to "NO", and the control is finished.

Figure 8:
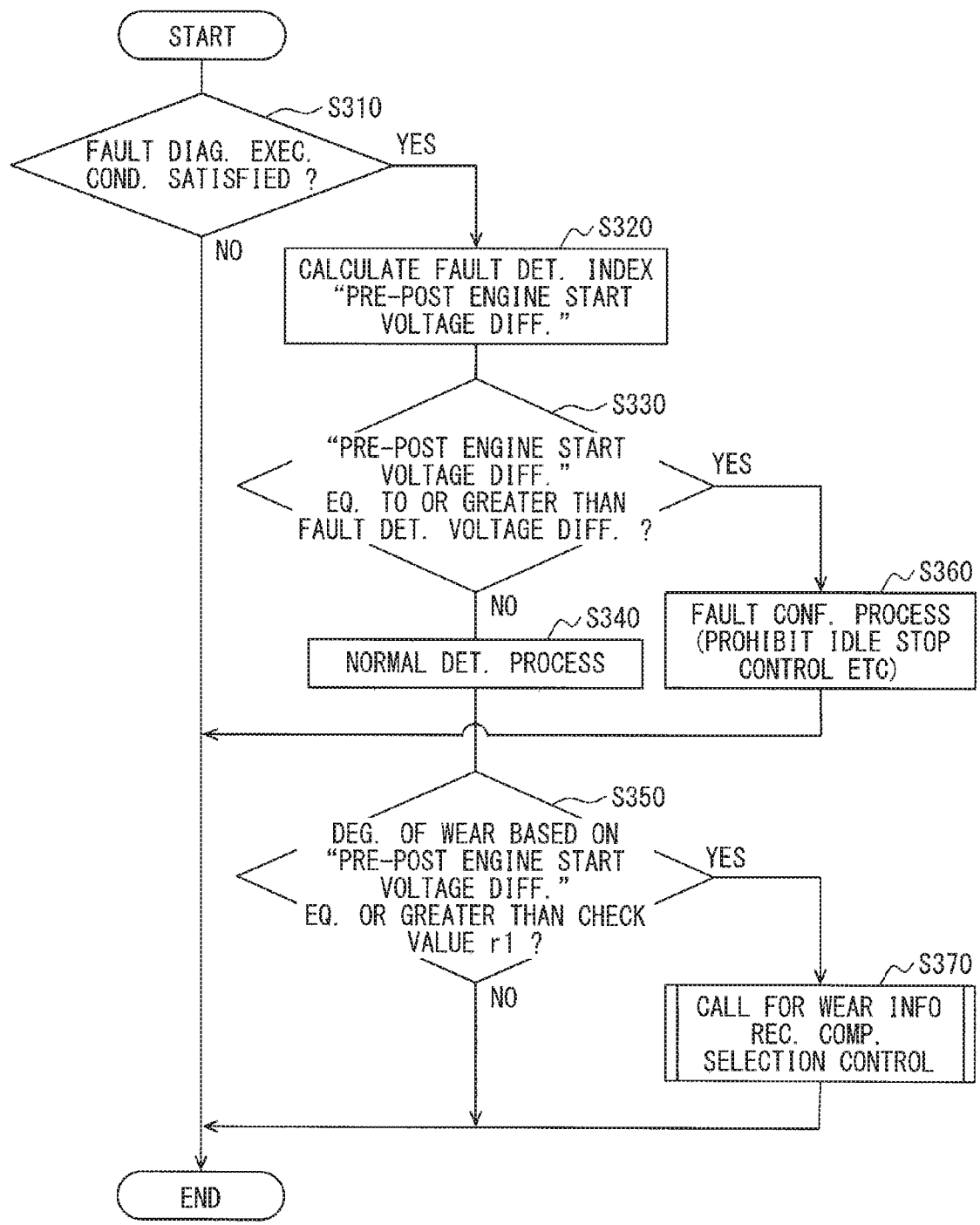
FIG. 8 is a flowchart of a control which determines fault and deterioration of a battery.

Next, a flowchart of FIG. 8 shows the contents of the control for detecting a deterioration fault of a vehicle component, e.g., a battery.

In Step S310 of FIG. 8, it is determined whether the fault-diagnosis execution condition of the battery is satisfied, that is, it is determined whether an obtainment of data for the calculation of a fault check index (i.e., the wear check parameter, that may be, for example, a "voltage difference before and after the engine start") is complete.

In such case, since the voltage difference may be calculable based on a before-start voltage V1 and an after-start voltage V2, it may be determined as to whether the measurement of the voltage V1 and the voltage V2 is complete as the required data.

In the above-mentioned Step S310, whether the fault-diagnosis execution condition is satisfied, the process proceeds to Step S320, and "the voltage difference before and after the engine start (PRE-POST ENGINE START VOLTAGE DIFFERENCE in FIG. 8)", i.e., the voltage difference of the voltage V1 and the voltage V2, is calculated as a fault check index.

Subsequently, the process proceeds to Step S330, and it is determined whether the fault check index, i.e., the voltage difference before and after the engine start, exceeds a preset fault determination voltage difference of the battery (i.e., the fault check value r2).

Here, when "the voltage difference before and after the engine start" is less than the fault determination voltage difference of the battery, the process proceeds to Step S340, and a predetermined normal determination process is performed.

Then, the process proceeds to Step S350, and, after calculating the degree of wear of the battery based on the "voltage difference before and after the engine start", it is determined whether the degree of wear is equal to or greater than the check value r1, i.e., a determination level of the degree of wear for memorizing the wear analysis data.

Here, when the degree of wear of the battery is less than the check value r1, the process in Step S350 proceeds to "NO", and the present control is finished without performing any step.

In the above-mentioned Step S350, when the degree of wear of the battery is equal to or greater than the check value r1, the process proceeds to Step S370, and a control is called for selecting a component for which the wear information shown in FIG. 6 is memorized. In such case, the battery is set up as the component X. Then, a program which performs a process shown in the flowchart of FIG. 6 for memorizing the wear information of the battery is started.

Further, in the above-mentioned Step S330, when "the voltage difference before and after the engine start" exceeds the fault determination voltage difference of the battery (S330: YES), the process proceeds to Step S360, and a predetermined fault confirmation process is performed.

In such case, a diagnostic trouble code of a battery fault is memorized, and an idle stop control is prohibited, and a user notification process for notifying the battery fault to the user as well as a record process for recording data for fault analyses, etc. are performed, and the present control is finished.

Figure 9:
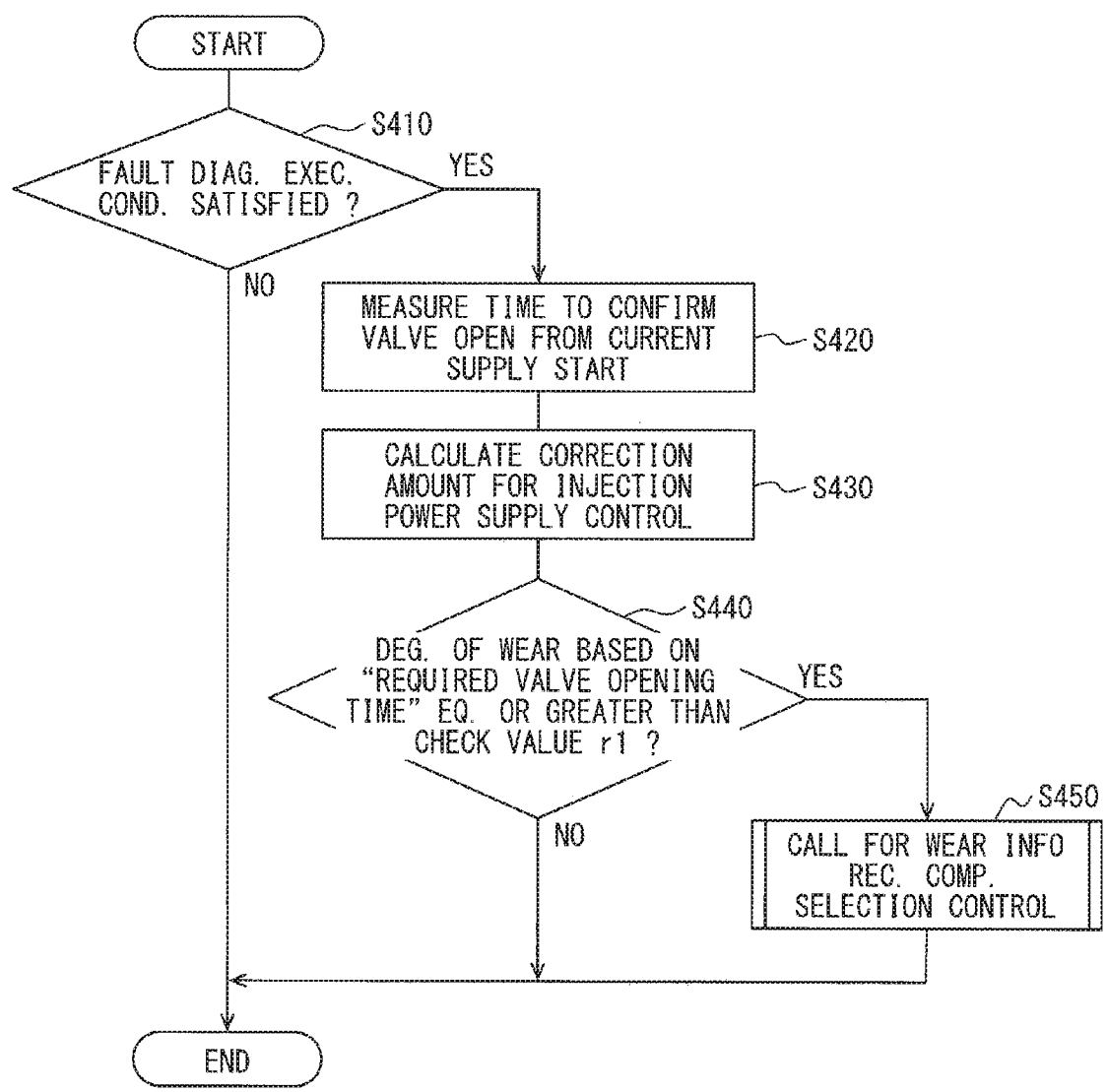
FIG. 9 is a flowchart of a control which determines fault and deterioration of an injector.

Next, a flowchart of FIG. 9 is described, which shows the contents of a control for detecting the deterioration fault of a component, e.g., a control for detecting the deterioration fault of the injector, for example.

In Step S410 of FIG. 9, it is determined whether the fault-diagnosis execution condition of the injector is satisfied. That is, it is determined whether the obtainment of the data required for the calculation of the fault check index, i.e., "the time from a start of the power supply to the injector to a confirmation of a valve opening of the injector" (i.e., the wear check parameter) is complete.

In such case, since such time may be measured as a period of time between time t3 during which the power supply to the injector is started, and time t4 during which the valve opening of the injector is confirmed, it may be determined as to whether the measurement of time t3 and time t4 is complete as the required data.

In the above-mentioned Step S410, when it is determined that the fault-diagnosis execution condition is satisfied, the process proceeds to Step S420, and the period of time between t3 and t4 is calculated (i.e., MEASURE TIME TO CONFIRM VALVE OPEN FROM POWER SUPPLY START) as a fault check index.

Subsequently, the process proceeds to Step S430, and the correction amount of the injection power supply control of the injector is calculated. In such case, the correction amount may be calculated, for example, as a required amount of advancement of the power supply timing for correcting the power supply for the injector according to the actual wear/deterioration of the injector.

Then, after proceeding the process to Step S440 and calculating the degree of wear of the injector based on the "time from a start of the power supply to the injector to a confirmation of a valve opening of the injector", or based on a "required valve opening time", it is determined whether the calculated degree of wear of the injector is equal to or greater than the determination level, i.e., the check value r1, of the degree of wear for memorizing the wear analysis data.

Here, when the degree of wear of the injector is less than the check value r1, the process proceeds to "NO" in Step S440 and the control is finished without performing any step.

In the above-mentioned Step S440, when the degree of wear of the injector is equal to or greater than the check value r1, the process proceeds to Step S450, and the control is called for selecting the wear information record component shown in FIG. 6. In such case, the injector is set up as the component X and the control shown in FIG. 6 is performed.

Then, after completing a start process of the control (i.e., the control for selecting the wear information record component) shown in FIG. 6, the control is finished.

Next, a flowchart of FIG. 11 shows the procedure and operation of vehicle maintenance and vehicle repair work by connecting the vehicle diagnostic device 9 to the connector 8 (i.e., a diagnostic connector 8) of a vehicle.

In Step S510 of FIG. 11, a diagnostic communication between the engine ECU 1 and the vehicle diagnostic device 9 is enabled by connecting the vehicle diagnostic device 9 (i.e., a diagnostic tester) to the diagnostic connector 8 of the vehicle.

Then, the process proceeds to Step S520, and the vehicle diagnostic device 9 obtains commonly known diagnostic information (for example, the diagnostic trouble code, freeze frame data, fault-analysis data, etc.) from the engine ECU 1. The above-mentioned diagnostic information may be memorized in the nonvolatile memory 5, or may be memorized in a memory in the engine ECU 1.

Then, the process proceeds to Step S530, and the vehicle diagnostic device 9 obtains, from the engine ECU 1, the wear information of the component, i.e., the data for wear analysis of each component memorized in the wear information record area of the nonvolatile memory 5.

Subsequently, the process proceeds to Step S540, and a repair mechanic (e.g., an operator who performs replacement of the components) determines whether there is any faulty component based on the diagnostic information obtained at the above-mentioned Step S520, i.e., determines whether to perform a repair/replacement work of the component or not.

Here, when a faulty component is found, the process proceeds to Step S550, and the repair mechanic performs the repair/replacement work of the faulty component. When there are two or more faulty components, the process of each of Step S540 and Step S550 is performed repeatedly for multiple times.

Then, when the process proceeds to Step S552, and the repair/replacement work of the faulty component is complete, the repair mechanic checks and confirms a normal operation (i.e., a returning to normal operation) of the repaired/replaced component by reading the information of the repaired/replaced component from the engine ECU 1 with an operation of the vehicle diagnostic device 9.

Then, after proceeding to Step S554, the repair mechanic transmits information on an erasure request for erasing the diagnostic information by operating the vehicle diagnostic device 9. The engine ECU 1 performs erasure of the diagnostic information based on the received erasure request. The process of S550 to S554 shows a conventionally-performed repair work.

Then, the process proceeds to Step S560, and it is determined by the vehicle diagnostic device 9 whether there is any worn component (i.e., a component that requires a repair) based on the wear information obtained in the above-mentioned manner.

Here, when a worn component is found, the process proceeds to Step S570, and the repair mechanic performs the repair/replacement work of the worn component. In such case, based on the wear information (i.e., the wear analysis data) of the component, it is determined whether the component is repaired or replaced.

For example, in view of a prospective fault happening of the subject component or an expected reduction of the fuel mileage caused by the subject component by the next check-up of the vehicle, the repair mechanic may determine the repair/replacement work of the component based on a discussion and agreement of an owner of the vehicle, just like the replacement procedure of the worn tire.

When there are two or more worn components, the process of each of Step S560 and Step S570 is performed repeatedly for multiple times.

Then, after proceeding to Step S580 and the repair/replacement work of the component is complete, the repair mechanic checks and confirms a normal operation (i.e., a returning to normal operation) of the repaired/replaced component by reading the information of the repaired/replaced component from the engine ECU 1 with an operation of the vehicle diagnostic device 9.

Then, after proceeding to Step S590 and upon confirmation of the normal operation (i.e., a returning to normal operation) of the repaired/replaced component, the repair mechanic transmits information on an erasure request for erasing the wear information by operating the vehicle diagnostic device 9. The process of the control of FIG. 11 is then finished.

Next, a control at a time when the engine ECU 1 receives, from the vehicle diagnostic device 9, the information on the erasure request for erasing the wear information is described with reference to FIG. 10.

Figure 10:
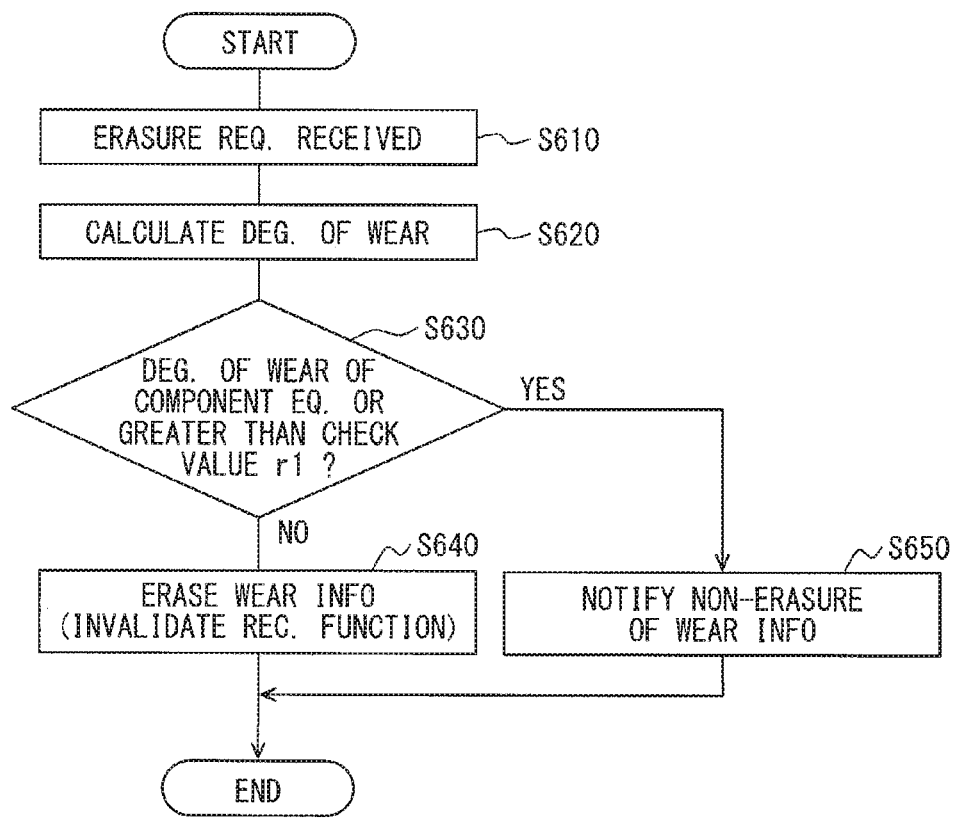
FIG. 10 is a flowchart of a control which erases the deterioration information.
Figure 11:
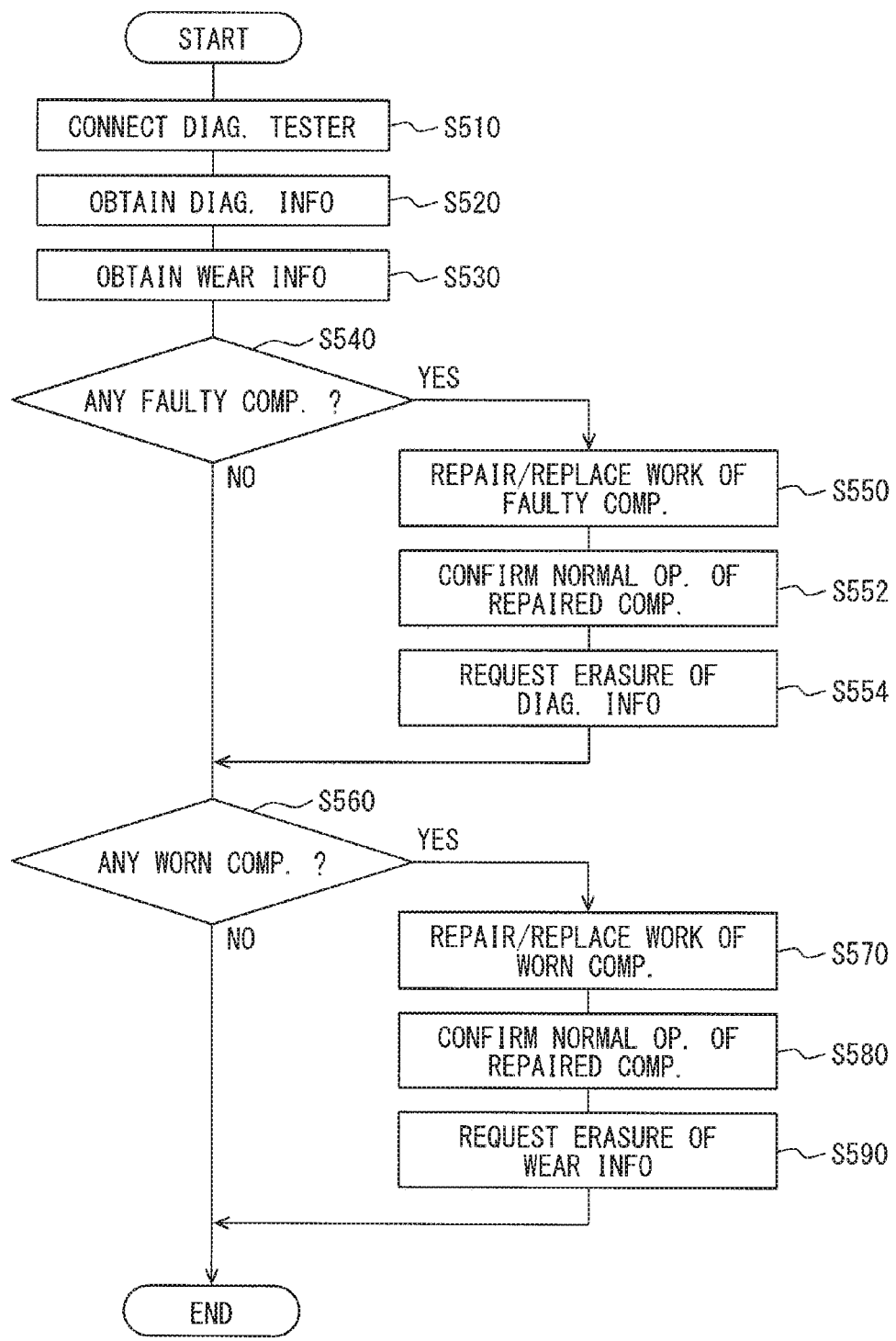
FIG. 11 is a flowchart of a repair work by using a vehicle diagnostic device.

FIG. 10 is a flowchart of a program that is executed for each of the components for which the degree of wear is calculated when the engine ECU 1 receives the erasure request of wear information from the vehicle diagnostic device 9.

Note that, when the engine ECU 1 receives the erasure request of the diagnostic information from the vehicle diagnostic device 9 and the requested erasure of the diagnostic information of a certain component is performed, the control of FIG. 10 may be performed and the wear information of the certain component may be erased at the same time.

First, in Step S610 of FIG. 10, the engine ECU 1 checks whether there is any erasure request for erasing the wear information received from diagnostic system 9. Then, the process proceeds to Step S620, and the degree of wear is calculated (i.e., the degree of wear is calculated from the latest wear check parameter obtained).

Then, the process proceeds to Step S630, and it is determined whether the degree of wear of a certain component (i.e., an object component of the erasure request of wear information) has reached the check value r1 (i.e., whether the degree of wear is equal to or greater than the check value r1 or not).

In the above-mentioned Step S630, when the degree of wear is less than (i.e., has not reached) the check value r1, it is determined that the repair/replacement of the component is confirmed, and the process proceeds to Step S640.

In Step S640, the engine ECU 1 erases the wear information about the repaired/replaced object component from the nonvolatile memory 5. In such case, the component-specific wear-information recorder 13 in the control unit 2 of the engine ECU 1 may erase the wear information. That is, the component-specific wear-information recorder 13 may serve as the eraser in the claims.

By the erasure of the wear information, the memory area of the nonvolatile memory 5 is initialized (i.e., memory is "released/freed"), and the wear information of other components may be written now in the above-mentioned memory area of the nonvolatile memory 5.

Further, in the above-mentioned Step S640, beside the erasure of the memory area, a function of the component-specific wear-information recorder 13 in the control unit 2 of the engine ECU 1 (i.e., a recording function) is invalidated which corresponds to the repaired/replaced component.

Then, the present control is finished.

On the other hand, in the above-mentioned Step S630, when the degree of wear is equal to or greater than the check value r1, the process proceeds to Step S650, since it is apparent that (A) the repair/replacement of the component corresponding to the erasure request is not yet complete or (B) the repair/replacement work is incomplete.

In Step S650, the engine ECU 1 is prevented from erasing the wear information about the repaired/replaced component in the nonvolatile memory 5, and the ECU 1 notifies the user of the non-erasure of the wear information.

In such case, it may be preferable that the engine ECU 1, for example, is configured to transmit the information of the non-erasure of the wear information to the vehicle diagnostic device 9, and the vehicle diagnostic device 9 is configured to display the information of the non-erasure of the wear information on a display of the vehicle diagnostic device 9.

Then, the present control is finished.

According to the configuration of the present embodiment described above, the wear information (i.e., wear analysis data) of the component is written in the nonvolatile memory 5 when the degree of wear of the component disposed in a vehicle has reached the check value r1, thereby enabling an operation of recording the wear information of the component at a certain time during a deterioration, i.e., wear, of the in-vehicle component. That is, by reading and analyzing the recorded wear information, the cause of the fault of the component is easily and clearly analyzable.

Further, in the above-mentioned embodiment, when the wear information of each of the plural components is written in the nonvolatile memory 5, such information is written in the memory 5 in an order of reaching the degree of wear of the component to the check value r1. In such configuration, even though the size, i.e., the memory capacity, of the nonvolatile memory 5 is relatively small, the wear information may be memorized in an order of the far-deteriorated components, i.e., according to the descending order of the degrees of wear of each of the components, the analysis of the cause of the fault is performable with reference to the wear information at the time of detecting a fault of the component. Note that, since the memory capacity of the nonvolatile memory 5 is configured to be greater than the maximum size of the wear information of the components, the wear information of at least one of the plural components is securely recordable in the nonvolatile memory 5.

When the degree of wear of the component is written in the nonvolatile memory 5 at a time of having the degree of wear of the component reaching to the check value r1, should the wear information of the component to be written in the nonvolatile memory 5 be greater than the size of vacancy of the record area of the nonvolatile memory 5, it is configured so that the writing of the wear information to such area is not performed (i.e., the recorder 13 forgoes writing the wear information to the record area of the nonvolatile memory 5).

According to such configuration, when vacancy of the nonvolatile memory 5 is small, an incomplete writing/recording of the wear information of the component in the nonvolatile memory 5 is prevented, thereby enabling a secure writing and recording of the wear information of the component which has the smaller information size than the size of vacancy of the nonvolatile memory 5.

Further, in the above-mentioned embodiment, when the erasure request of the wear information of the component is received from the vehicle diagnostic device 9, the wear information of the component is configured to be erased from the nonvolatile memory 5. Therefore, by erasing the wear information which is not required any more after the reading, the size of vacancy of the nonvolatile memory 5 is increased, thereby the wear information is recordable for the increased number of components.

Further, in the above-mentioned embodiment, when the erasure request of the wear information of the component is received from the vehicle diagnostic device 9 and it is confirmed that the degree of wear of the object component regarding the erasure request has not reach the check value r1, it is configured that a record function for recording the wear information of the component (i.e., the function of each of the wear information recorders 14, 15, 16 and the like) is invalidated.

According to such configuration, malfunction, such as recording the wear information of the component with the degree of wear not yet reaching the check value r1, is securely prevented.

Further, in the above-mentioned embodiment, when the erasure request of the wear information of the component is received from the vehicle diagnostic device 9 and it is confirmed that the degree of wear of the object component regarding the erasure request has reached the check value r1, it is configured that the wear information of the above-mentioned component is not erased (i.e., the eraser 13 forgoes erasing the wear information) from the nonvolatile memory 5.

According to such configuration, the erasure of the wear information of the worn component by accident, for example, is securely prevented.

Further, in the above-mentioned embodiment, the degree of wear is calculated for all of the components for which the degree of wear is detected. However, the degree of wear may be determined only for the preset important components, for determining whether the degree of wear has reached the check value. In such case, the important component may be preferably specified/identified by an operation of the vehicle diagnostic device 9 that is connected to the vehicle (i.e., based on the communication data transmitted from the device 9). For example, by assigning a component ID to each of the plural components in the vehicle, the important component may be identified by the operation of the device 9 by specifying the component ID of the important component (i.e., by transmitting the information that specifies the component ID). Further, selection of which one of (i) the currently-specified wear-information record component and (ii) the newly-specified component from the device 9 may be performed based on a preset priority among the in-vehicle components. Further, regarding the component with the degree of wear not having reached the check value r1, the recordation of the wear information may be configured to be enabled according to the operation of the vehicle diagnostic device 9 (i.e., based on the communication data from the vehicle diagnostic device 9), i.e., the wear information of the specified component may be immediately started upon receiving a record instruction from the vehicle diagnostic device 9.

In the above-mentioned embodiment, the present disclosure is applied to the engine ECU 1. However, the present disclosure may be applicable not only to the ECU 1, but also to other in-vehicle electronic control units for use in a vehicle.

Further, although the present disclosure has been described in connection with preferred embodiment thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. An in-vehicle electronic control unit (ECU) for diagnosing a fault of a component in the vehicle and for detecting a degree of deterioration of the component in the vehicle, the ECU comprising:
    a deterioration information memory configured to store deterioration information of the component; and
    a microcomputer configured to
       check whether the degree of deterioration has reached a check value for the component, wherein the check value limits recordation of the deterioration information in the deterioration information memory of the ECU,
       write the deterioration information of the component to the deterioration information memory, when the degree of deterioration of the component has reached the check value, and
       output the deterioration information of the component from the deterioration information memory to a vehicle diagnostic device to display the deterioration information of the component on the vehicle diagnostic device, when the output deterioration information exceeds the degree of deterioration that would lead to a fault of the component.

2. The electronic control unit of claim 1, wherein
    the microcomputer writes the deterioration information of the component to the deterioration information memory, when the degree of deterioration of the component reaches the check value, and
    during the writing of the deterioration information, a writing order of the deterioration information is arranged among plural components, when the degree of deterioration of the component has reached the check value.

3. The electronic control unit of claim 1, wherein
    the deterioration information memory has an information storage capacity that is greater than a maximum size of the deterioration information among plural components.

4. The electronic control unit of claim 3, wherein
    the microcomputer is further configured to forego writing the deterioration information to the deterioration information memory, when a size of the deterioration information of the component to be written to the deterioration information memory exceeds a size of vacant area of the deterioration information memory, upon a time when the deterioration information of the component is to be written to the deterioration information memory due to an increase of the degree of deterioration of the component reaching the check value.

5. The electronic control unit of claim 1, wherein
    the microcomputer is further configured to erase the deterioration information of the component from the deterioration information memory, when receiving an erasure request of the deterioration information of the component from a vehicle diagnostic device.

6. The electronic control unit of claim 5, wherein
    the microcomputer is further configured to invalidate a record function that records the deterioration information of the component, when the degree of deterioration of the component is confirmed as being lower than the check value, at a time of receiving the erasure request of the deterioration information of the component.

7. The electronic control unit of claim 5, wherein
    the microcomputer is further configured to forgo erasing the deterioration information of the component from the deterioration information memory, when the degree of deterioration of the component is confirmed as having reached the check value at a time of receiving the erasure request of the deterioration information of the component.

8. The electronic control unit of claim 1, wherein
    the microcomputer is further configured to identify the component of which the degree of deterioration is checked, based on communication data that is available from a vehicle diagnosis device via communication.

9. The electronic control unit of claim 1, wherein
    the deterioration information memory in the ECU is configured to have, for each of plural components in the vehicle, a pre-determined amount of storage, in the deterioration information memory in the ECU, of the wear information.

10. An in-vehicle electronic control system, comprising an in-vehicle electronic control unit (ECU), the ECU including:

a deterioration information memory configured to store deterioration information of a component in the vehicle; and a microcomputer configured to
  check whether a degree of deterioration has reached a check value for the component, wherein the check value limits recordation of the deterioration information in the deterioration information memory of the ECU, and
  write the deterioration information of the component in the deterioration information memory, when the degree of deterioration of the component has reached the check value; and sensors, actuators, and a vehicle diagnostic device connected to the ECU, wherein the microcomputer is further configured to output the deterioration information of the component from the deterioration information memory to the vehicle diagnostic device to display the deterioration information of the component on the vehicle diagnostic device, when the output deterioration information exceeds the degree of deterioration that would lead to a fault of the component.

11. An in-vehicle electronic control unit (ECU) for determining wear information for a component in a vehicle, the electronic control unit comprising:

a communications interface configured to determine a connection of a vehicle diagnostic device to the electronic control unit and to communicate with the vehicle diagnostic device;

an input/output device configured to receive a signal from the component;

a memory configured to store the wear information for the component; and a microcomputer configured to
  receive the signal from input/output device,
  calculate the wear information for the component based on the signal,
  compare the wear information against a check value, wherein the check value limits recordation of the deterioration information in the deterioration information memory of the ECU, and
  save the wear information to the memory when the wear information exceeds the check value, wherein the microcomputer is further configured to, upon determining the connection of the vehicle diagnostic device to the electronic control unit, retrieve the wear information from the memory and output the wear information via the communication interface to the vehicle diagnostic device to display the wear information for the component on the vehicle diagnostic device, when the wear information exceeds the check value that would lead to a fault of the component.

12. The electronic control unit of claim 11, wherein the wear information is a degree of wear percentage value.

13. The electronic control unit of claim 11, wherein the microcomputer is further configured to compare the wear information against a fault check value and save diagnostic information for the component to the memory when the wear information exceeds the fault check value, and wherein upon determining the connection of the vehicle diagnostic device to the electronic control unit, retrieve the diagnostic information from the memory and output the diagnostic information via the communication interface to the vehicle diagnostic device to display the diagnostic information for the component on the vehicle diagnostic device.

14. The electronic control unit of claim 13, wherein the diagnostic information is a diagnostic trouble code.

* * * * *